US005572327A

United States Patent [19]
Plinke et al.

[11] Patent Number: 5,572,327
[45] Date of Patent: Nov. 5, 1996

[54] REMOTE LEAK DETECTION SENSING METHOD AND DEVICE

[75] Inventors: Marc A. E. Plinke, Baltimore, Md.; Gernot G. Pranghofer, Wasserburg; Ulrich Virnich, Neumarkt, both of Germany

[73] Assignee: W. L. Gore & Associates, Inc., Newark, Del.

[21] Appl. No.: 384,270

[22] Filed: Feb. 1, 1995

[51] Int. Cl.$^6$ .................... G01N 15/06; G01N 21/89; B01D 46/00
[52] U.S. Cl. .................... 356/438; 55/274; 55/341.1; 340/605
[58] Field of Search .................... 356/438, 439, 356/55; 340/605, 607; 55/274, 241.1

[56] References Cited

U.S. PATENT DOCUMENTS

| | | | |
|---|---|---|---|
| 3,739,557 | 6/1973 | Anderson et al. | 55/341.1 X |
| 3,820,897 | 6/1974 | Roess | 356/438 X |
| 3,865,561 | 2/1975 | Osborn | 356/439 X |
| 4,580,311 | 4/1986 | Kurz | 356/438 X |
| 5,255,074 | 10/1993 | Kimbell et al. | 356/445 |
| 5,363,198 | 11/1994 | Fournier | 356/438 |

OTHER PUBLICATIONS

G. Ramachandran et al., "Extraction of Aerosol–Size Distributions from Multispectral Light Extinction Data," Aerosol Science and Technology 17, pp. 303–325 (1992).

G. Ramachandran et al., "Extraction of Spatial Aerosol Distributions from Multispectral Light Extinction Measurements with Computed Tomograph," J. Opt. Soc. Am. A. vol. 11, No 1, Jan. 1994, pp. 144–154.

Todd et al., "Evaluation of Algorithms for Tomographic Reconstruction of Chemical Concentrations in Indoor Air," 55 Am. Ind. Hyg. Assoc. J., May 1994, pp. 403–417.

*Primary Examiner*—Vincent P. McGraw
*Attorney, Agent, or Firm*—David J. Johns; Carol A. Lewis White

[57] ABSTRACT

The present invention is an improved method and apparatus for monitoring the status of particle filtration devices found in various filter units. The invention employs one or more light sources aimed across the filter units and one or more corresponding detectors that detect changes in light intensity from the light source. When a leak occurs whereby dust is released into the atmosphere around any given filter, the detectors will note a decrease in light intensity and will signal a problem. By using multiple light sources and detectors, or by getting signals from different angles from a single light source and detector, the present invention allows for quick and accurate pin-pointing of leakage problems.

18 Claims, 6 Drawing Sheets

REMOTE LEAK DETECTION SENSING METHOD AND DEVICE

BACKGROUND OF THE INVENTION

1. Field of the Invention

The present invention relates to methods and apparatus for detecting leaks in particle filtration apparatus, and especially to methods and apparatus for remote sensing of leaks in filter bags, cartridges, or other filter devices in filter houses. A remote leak detection sensing method represents an optimization of the filtration process.

2. Description of Related Art

A common problem in the maintenance of filter houses is the monitoring of filter devices (e.g., filter bags or filter cartridges) for leaks. While leaks from a single filter device (e.g., a cartridge or bag) is not generally difficult to detect, detecting and pin-pointing a leak in a large filter house, having a vast array of filter devices arranged in a matrix of rows and columns is often a very burdensome (and sometimes dangerous) task. As is explained below, none of the current methods for detecting leaks is considered entirely satisfactory.

Leak detection of single bags is currently performed using the so-called "black light" test. In this method, a fluorescent dust is introduced into the raw gas stream upstream the filter house. A compartment in which a leak is suspected has to be taken off-line or shut down, in many cases requiring cooling for several hours so that humans can enter. Usually a maintenance worker wearing protective clothing will then enter the compartment and shine an ultraviolet ("black") light into the clean gas side of the suspect filter devices to search for the fluorescent dust which has leaked into the clean gas side. Leaks are detected in those filter devices containing fluorescent dust on their clean side. The same method is used to detect leaks in the installation area of bags in the tube sheet. Needless to say, this is an expensive and time consuming process. When the leaking filter device is not found in the suspected compartment, another compartment must then be shut down, with resulting interruption of normal operation and with a resulting release of hazardous filtrates into ambient air. Also, it is a dangerous job to climb into a filter house—high temperatures, poisonous gases, and poisonous dusts (e.g., dusts containing dioxins and furans as well as heavy metal) are found frequently in this environment. Although the black light test is the most commonly used method to detect leaks, it can only be used when excessive dust concentrations in the flue gas are observed using a different method such as continuous emission monitoring systems (e.g., CEMS, opacity meters).

Opacity test methods are used to detect dust emissions in the flue gas exiting the gas cleaning equipment through the stack. The opacity test measures light extinction of a light ray through dust particulates dispensed in the gas stream as it exits a flue gas stack. These measurements are conducted only in the stack to quantitatively determine a dust leak, not to specifically locate broken or badly installed filter bags. Commercial opacity meters include those available from Bailey Controls Co., Wickliffe, Ohio, Datatest, Inc., Levittown, Pa., Enviroplan, Inc., Indianapolis, Ind., Land Combustion, Inc., Bristol, Pa., Monitor Labs Corp., Englewood, Colo., Montrol Co., Farmington Hills, Mich., and others.

Remote sensing of dust particle concentrations have been studied in other application areas. See, e.g., G. Ramachandran et al., "Extraction of Aerosol-Size Distributions from Multispectral Light Extinction Data," 17 *Aerosol Science and Tech.* 303–25 (1992); G. Ramachandran et al., "Extraction of Aerosol-Size Distributions from Multispectral Light Extinction Measurements with Computed Tomography," 11 *J. Opt. Soc. Am. A* 144 (January 1994); Todd et al. "Evaluation of Algorithms for Tomographic Reconstruction of Chemical Concentrations in Indoor Air," 55 *Am. Ind. Hyg. Assoc. J.* 403 (May 1994). The object of this research was to detect the dust concentration, dust particle size distribution, and gas composition in indoor air (e.g., workplace air exposed to workers in industry). Their idea was a real-time measurement of ambient air composition. This goal was to be achieved by using a few lasers scanning the room air in a two dimensional plane. To reduce the number of lasers and detectors needed to scan a wide area, it was proposed that a series of mirrors could be installed to reflect the light beams through extended paths between each laser and its respected detector or detectors. These investigations resulted in theoretical solutions for remote sensing of workplace contamination, but, apparently, no practical embodiment of such a system has been developed.

Until the present invention, it has not been proposed to try and adapt these kinds of remote sensing systems for use in monitoring the status of filter devices in a filter house. Perhaps one reason for this is that filter houses require special installation parameters due to the extreme harshness of that environment. For example, a typical filter house is replete with vibrations, acidic gases, high temperatures, and "upset" conditions in which the dust concentrations, even on the clean gas side of a filter, can be substantial.

Accordingly, it is a primary purpose of the present invention to provide reliable and efficient method and apparatus for detecting changes in status of filter devices in a filter house.

It is a further purpose of the present invention to provide a method and apparatus for detecting changes in status of filter devices in a filter house that allow leaking devices to be rapidly identified with minimal disruption in the operation of the filter house and with reduced environmental impact.

It is still another purpose of the present invention to provide a method and apparatus for detecting changes in the status of filter devices in a filter house that allow monitoring of particle size and concentration.

These and other purposes of the present invention will become evident from review of the following specification.

SUMMARY OF THE INVENTION

The present invention is an improved method and apparatus for monitoring the status of filter devices found in various filter units. In its simplest form, the present invention comprises a light source used in conjunction with a light sensor and a metering device. By directing the light source across the top, side, and/or bottom of a filter device, a base-line measurement can be determined. Subsequent measurements across the same light path will indicate changes in the amount of light passing across the filter device. In this manner, leaks and other changes in filter device status can be monitored, even on a real-time basis. A reduction in the intensity of specific light beam indicates dust from a leaking filter device in the light path.

In common filtration applications involving large arrays of filter devices, a series of light sources and/or sensors can be mounted to detect changes in rows and columns of filter devices. Leaks can then be rapidly pin-pointed by determining changes in the matrix measurements from the filter array.

The use of electronic measuring and monitoring equipment may allow human exposure to the harsh environments of the filter houses to be reduced or completely eliminated.

The present invention enables the user to detect a single leaking filter in the filter house without interference in the process from the outside. The clean gas side in the filter house may be scanned by one or several light sources and the light beams are detected by one or several detectors.

DESCRIPTION OF THE DRAWINGS

The operation of the present invention should become apparent from the following description when considered in conjunction with the accompanying drawings, in which.

DETAILED DESCRIPTION OF THE INVENTION

The present invention is an improved method and apparatus for detecting leaks and other changes in particle filtration apparatus.

Figure 1:
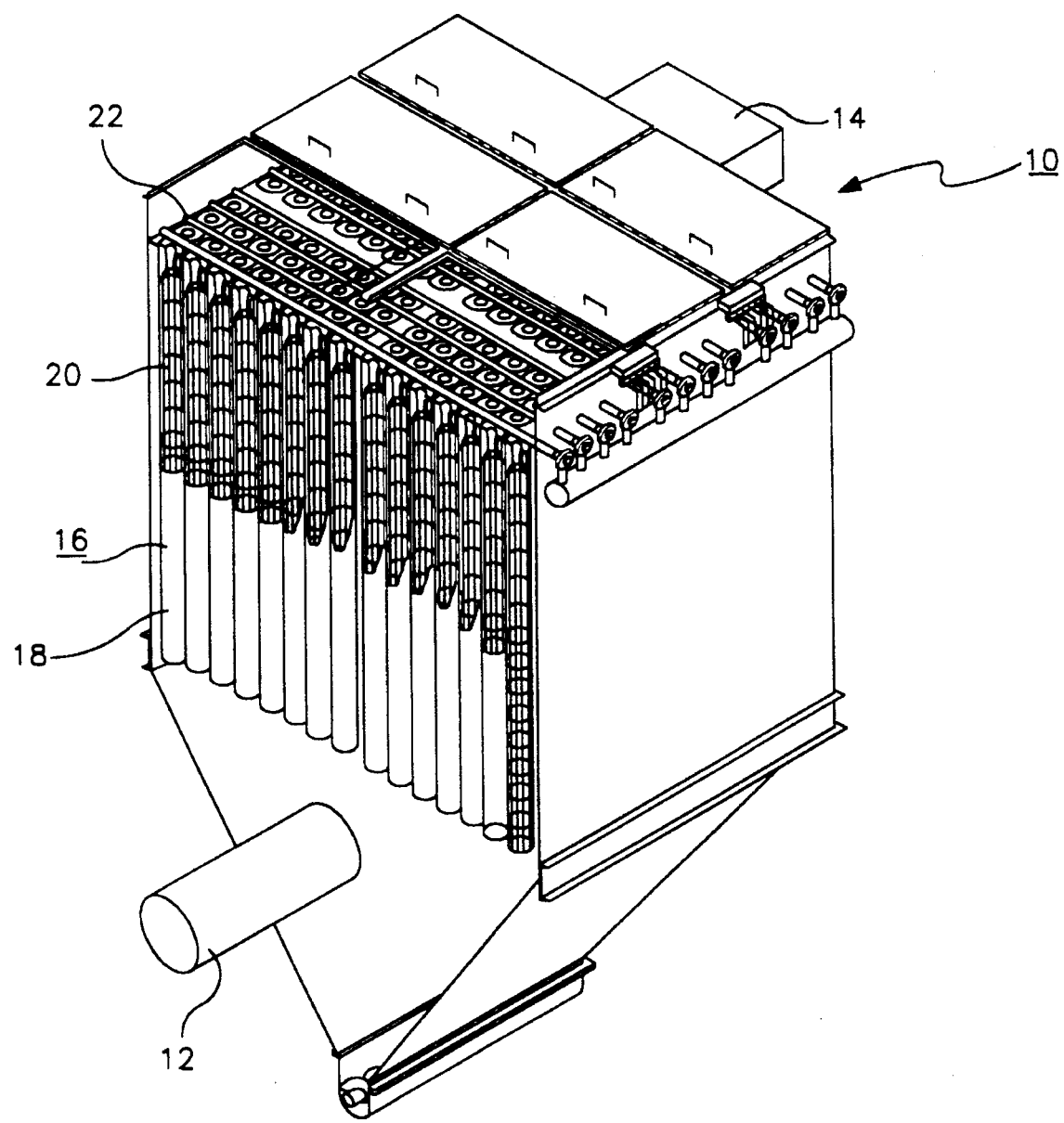
FIG. 1 is a three-quarter isometric view of a pulse-jet filter house, including a plurality of filter assemblies therein.

Shown in FIG. 1 is a typical pulse-jet type filter house 10 having a flue gas inlet 12, a flue gas outlet 14, and a plurality of filter (e.g., bag or cartridge) assemblies 16 mounted therein. The filter assemblies 16 each comprise a filter (e.g., bag or cartridge) 18 and a support cage 20. Gas is filtered through the filter 18, building a dust cake on the filter. Once the filters have built up a thick enough dust cake, the filters must be cleaned in order to assure a low pressure drop across the filter. In this particular type of filtration apparatus, the filters 18 are cleaned with pulse jets being emitted from a pulse jet pipe 22. Clean air leaves the dust collector through the clean air outlet 14.

During normal operation, the air above the filter assemblies is relatively clean, with minimal dust contamination leaking through the filters. However, if one of the filters develops a leak, dust particles enter the clean gas side and pollute the environment. Presently such leaks must be detected by human observation of excessive dust presence on the clean side of the filters, through detection on the clean air outlet, or detection of excess dust exiting the filter house (e.g., through the "stack").

To then determine the exact location of the leak, a tedious procedure must be followed whereby a tracer material (e.g., ultraviolet pigment powder) is introduced into the raw gas upstream of the suspected filters and leaks are pin-pointed using an ultraviolet ("black") light downstream of the filters. As has been noted, this process is time consuming, may be demanding on the health of the workers, and requires excessive down-time of the equipment during the pin-pointing procedure. This procedure is completely avoided through the use of the apparatus of the present invention.

Figure 2:
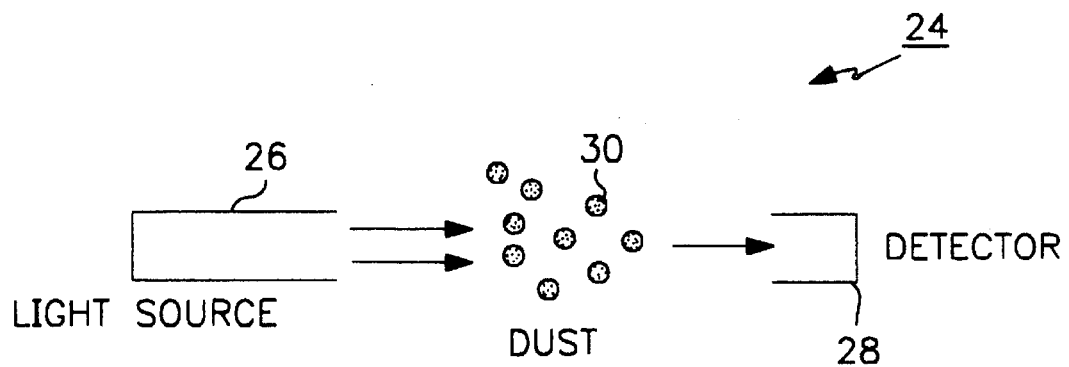
FIG. 2 is a schematic representation of one embodiment of a light source and sensor for use in the present invention.

FIG. 2 shows a basic construction of a sensor apparatus 24 for use in the present invention. This apparatus comprises a light source 26 and a separate detector 28. Suitable light sources may comprise conventional lamps (e.g., incandescent, halogen, arc, fluorescent, etc.), lasers, infrared lamps, ultraviolet lamps, etc. Preferably, the light source comprises one with a tight beam that can be accurately directed across a distance of up to about 15 meters. Additionally, the light source should have a very consistent light intensity over time.

The detector 28 should be complementary to the light source, providing a measurement of the light source and being sensitive enough to measure changes in the light source over time. Suitable sensors for use in the present invention include photoelectric cells that operate in appropriate wavelengths of the chosen light source and the temperature of the filter house. It is important that the sensitivity of the detector not change significantly over time. It is also important that both the light source and the detector are not clogged or otherwise interfered with over time by vibrations or other physical attack, chemical attack, dust accumulation, or other inherent filter house conditions.

In operation, by directing the light source 26 across the top, side, and/or bottom of a filter device to the detector 28, a base-line measurement can be determined. Subsequent measurements across the same light path will indicate changes in the amount of light passing across the filter device. In this manner, leaks in the filter can be monitored. A reduction in the intensity of specific light beam indicates dust 30 from a leaking filter device in the light path. For most applications, the light source 26 emits a predetermined amount of light energy and the detector 28 will monitor that amount of light to assure that it remains constant over time; at a pre-set change in light intensity, the detector will trigger a signal that excess dust has been detected and that a substantial leak may be present or imminent.

Figure 3:
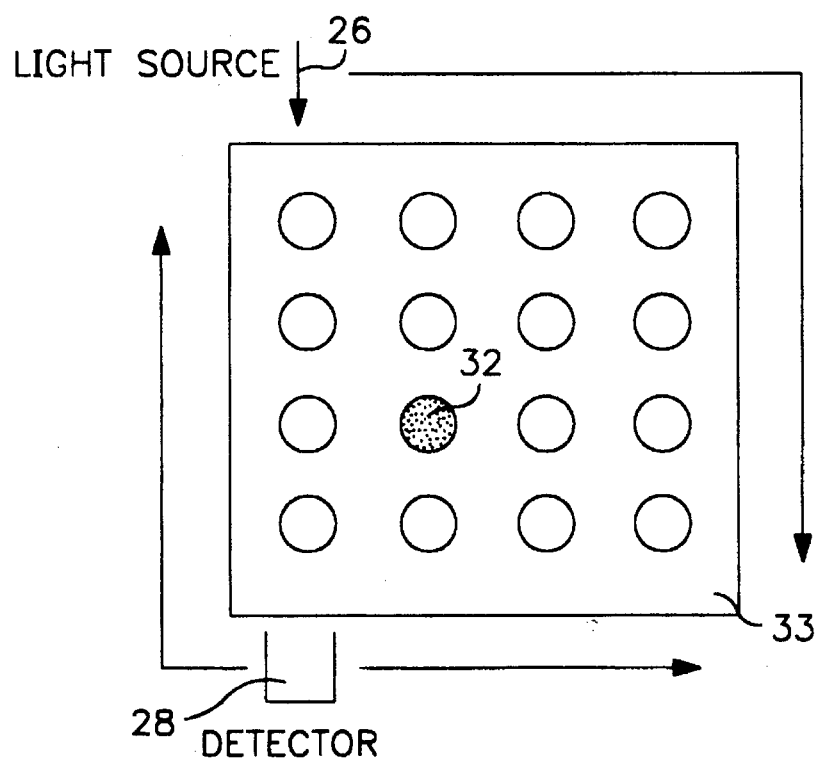
FIG. 3 is a top cut-away view of a filter house assembly, showing a filter tube sheet and showing the placement of light sources and sensors of one embodiment of the present invention.

In its most basic operation, a single light source 26 and detector 28 are moved manually or automatically along the rows and columns of the filter bag assemblies with readings being taken repeatedly. As is shown in FIG. 3, when a leak is detected in a filter 32 mounted in a tube sheet 33, its exact location can be pin-pointed by measuring along both the appropriate row and column (i.e, in a pulse jet filter, rows and columns can be defined as filter bag lines parallel and perpendicular to the pulse jet pipes). Detector reading can be taken on site or in a remote control unit. As should be appreciated, this process is much faster, more accurate, and safer than previous methods for locating leaks in a filter house environment. Moreover, this process can be performed without the need of interrupting the normal operation of the filter house, saving money and downtime for the facility.

Figure 4:
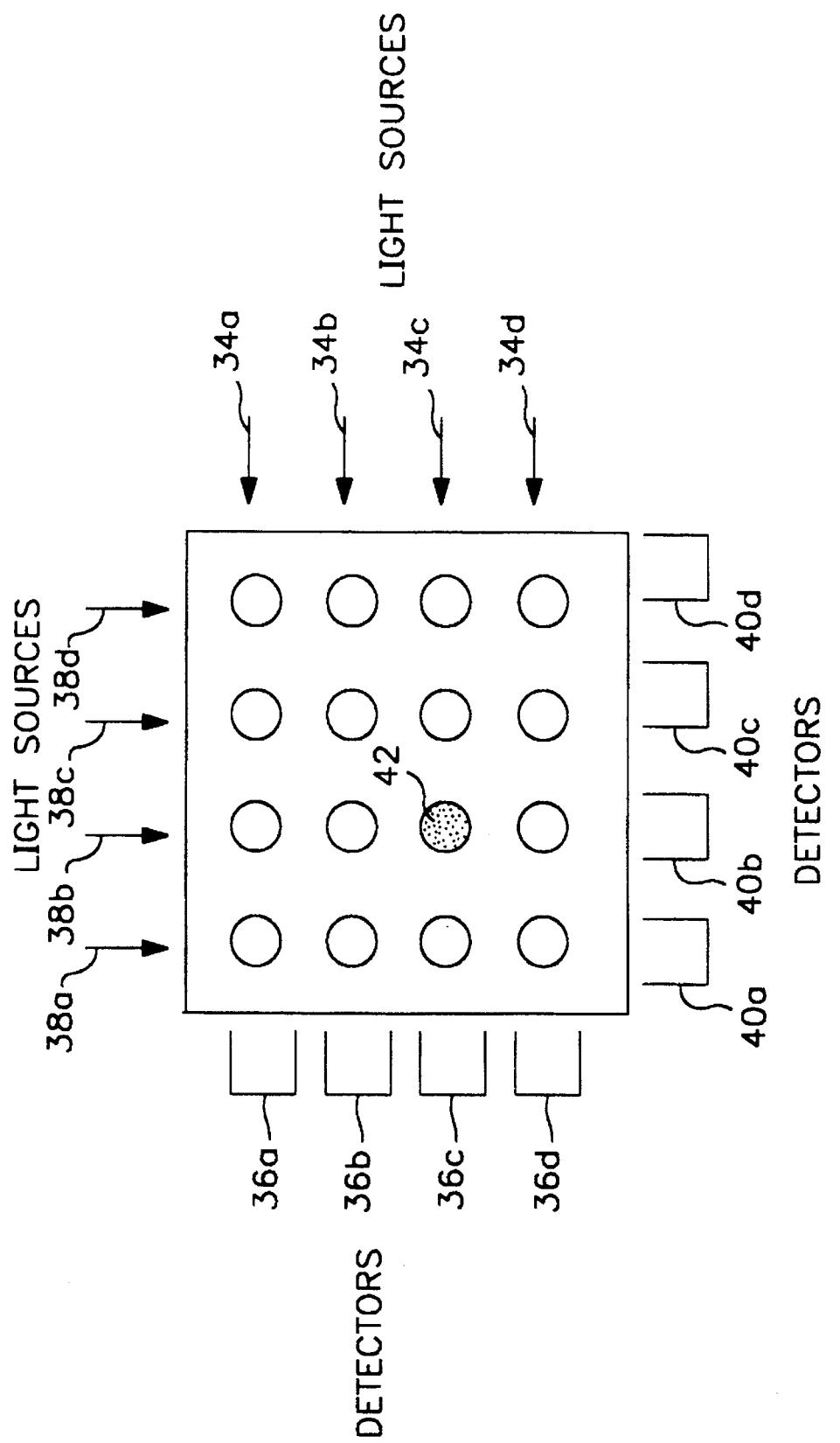
FIG. 4 is a top cut-away view of a filter house assembly, showing a filter tube sheet and showing the placement of light sources and sensors of another embodiment of the present invention.

Preferably, the sensing apparatus of the present invention is permanently mounted in the filter house to provide a regular or constant feedback on filter integrity. Shown in FIG. 4 is one embodiment of such an apparatus. In this instance, a series of light sources 34a, 34b, 34c, 34d and corresponding detectors 36a, 36b, 36c, 36d are set up along the rows of the filter house; and another series of light sources 38a, 38b, 38c, 38d and corresponding detectors 40a, 40b, 40c, 40d are set up along the columns of the filter house. Once set up in this manner, any change in light intensity can be monitored periodically or continuously across the filter house, with instant ("real-time") feedback in the case of a leak. In the example shown in FIG. 4, a leak in filter 42 will result in diminished light detected by detectors 36c and 40b. In this manner a technician can immediately identify the source of the leak and can take corrective action, such as taking the leaking filter off-line until replacement or repair can be performed. Additionally, it is contemplated that the present invention may be integrated into an electronic control system whereby a computer may both identify a leakage problem and take instant corrective action through appropriate automatic controls. Filter compartments can be taken off-line and single filters can be closed or exchanged almost immediately. Such action will decrease the active filter area but enable the user to continue the filtration process until the next shut down for filter of the leaking filters.

Figure 5:
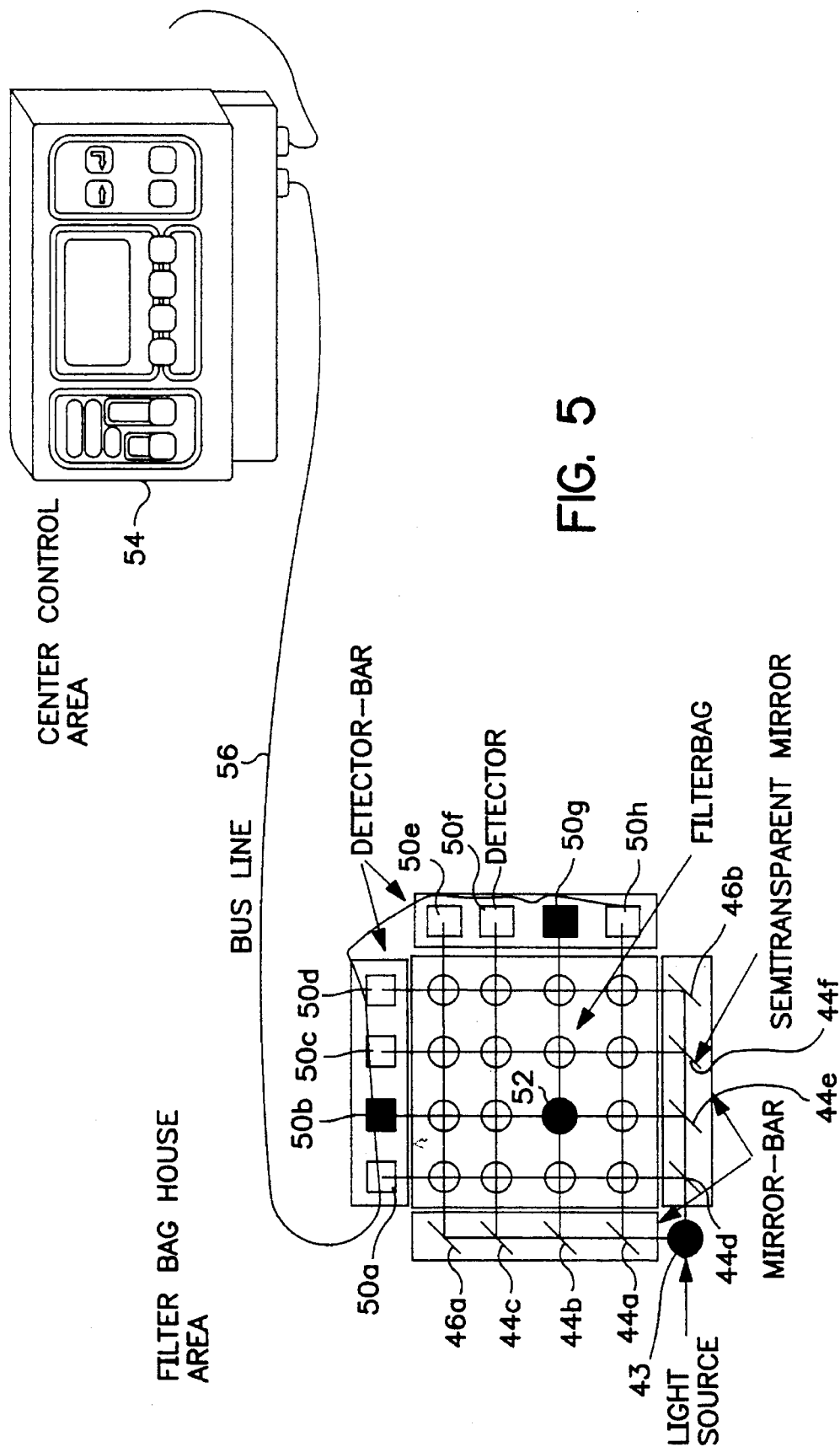
FIG. 5 is a top cut-away view of a filter house assembly, showing a filter tube sheet and showing the placement of light sources and sensors of yet another embodiment of the present invention, and an electronic control for such an embodiment.

Another embodiment of the present invention is shown in FIG. 5. It is recognized that light sources may be the most expensive aspect of the present invention to provide and maintain, as such, it is contemplated that the present invention may be set up to utilize one light source with multiple detectors in a given installation. FIG. 5 demonstrates that through the use of a single light source 43 and a series of semi-transparent mirrors 44a, 44b, 44c, 44d, 44e, 44f and mirrors 46a, 46b a single light beam may be directed to any one of eight different detectors 50a, 50b, 50c, 50d, 50e, 50f, 50g, 50h. In operation, a constant beam of light can be directed through and off the various semi-transparent mirrors 44 and mirrors 46 to detectors 50. Through careful selection of the degree of transparency of the semi-transparent mirrors, approximately equal light intensity can be provided to each of the detectors. It should be understood that equal light intensity may not be necessary for proper operation since each of the detectors need only measure changes in light intensity and the detectors can be calibrated accordingly. It should be understood that the optical devices are subject to blinding through the harsh filter house environment. Special precautions, such as purging the optical device being exposed to the flue gas, may have to be taken to minimize this blinding effect. Frequent calibrations of the remote sensing device may also be necessary. Again, a leak in filter 52 will be detected by detectors 50b and 50g to provide an exact defective filter location.

Also shown in FIG. 5 is an example of an electronic control 54 for use with the present invention. Each of the detectors 50 is connected via one or more cables 56 to the control apparatus 54. To limit expense and to reduce the possibility of false alarms, it is preferred that each of the detectors be provided with its own micro-controller and that all of the cables are fed to a remote electronic control apparatus via a single bus cable line 56. In this instance, each of the micro-controllers monitors analog signals from the detector, converts the analog signals into digital signals, and these digital signals are then communicated to the central control 54 (which may be located in a remote location). This is a robust and effective way to send data.

Among the advantages of the embodiments of FIGS. 4 and 5 is that no moving parts are required to be used, thus reducing maintenance and failure risk. Further, the ability to constantly monitor and correct for filter leakage assures that overall filter house operation can be made cleaner and more efficient than has been previously possible. Contamination of good bags can be avoided and, if required, the user of this new technology can reduce emissions to an absolute minimum by compensating production tolerances. The remote sensing method is the first method with which the performance of single filters can be evaluated. Bags which will not perform to the highest standards can be exchanged before damage to the environment is done. Additionally, in environments that are so sensitive to contamination that conventional bag filter houses can not be safely used since leaks may be too difficult to find and correct, the present invention provides a far more reasonably priced alternative over other systems, such as electrostatic precipitators (ESP).

Figure 6:
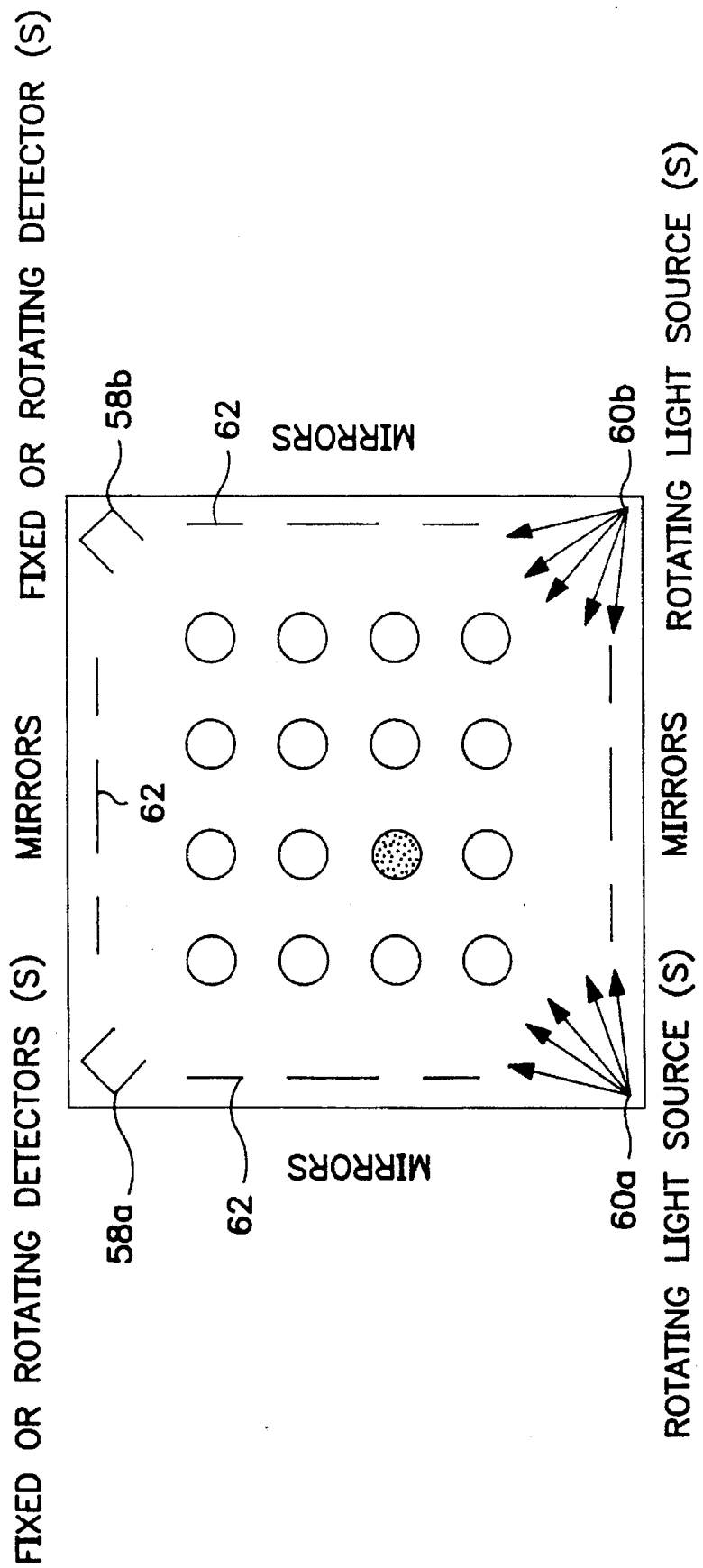
FIG. 6 is a top cut-away view of a filter house assembly, showing a filter tube sheet and showing the placement of light sources and sensors of still another embodiment of the present invention.

Still another embodiment of the present invention is shown in FIG. 6. This embodiment seeks to reduce the expense of detector devices 58 as well as light sources 60. In this instance, one or more light sources 60a, 60b are mounted so that they may be rotated to different positions across the filter house. Through appropriately placed mirrors 62 and/or semi-transparent mirrors, the light signals can then be directed across the various filters to one or more detectors 58a, 58b. The location of a leaking filter can then be determined by tracking the light source at a given positional angle and the detector indicating a change in light intensity. This embodiment of the present invention is particularly effective when combined with computed tomography techniques to rapidly determine the exact location of leaking filters. Computer hardware and software can be combined to provide accurate dust concentration information across the filter house using this apparatus.

Figure 7:
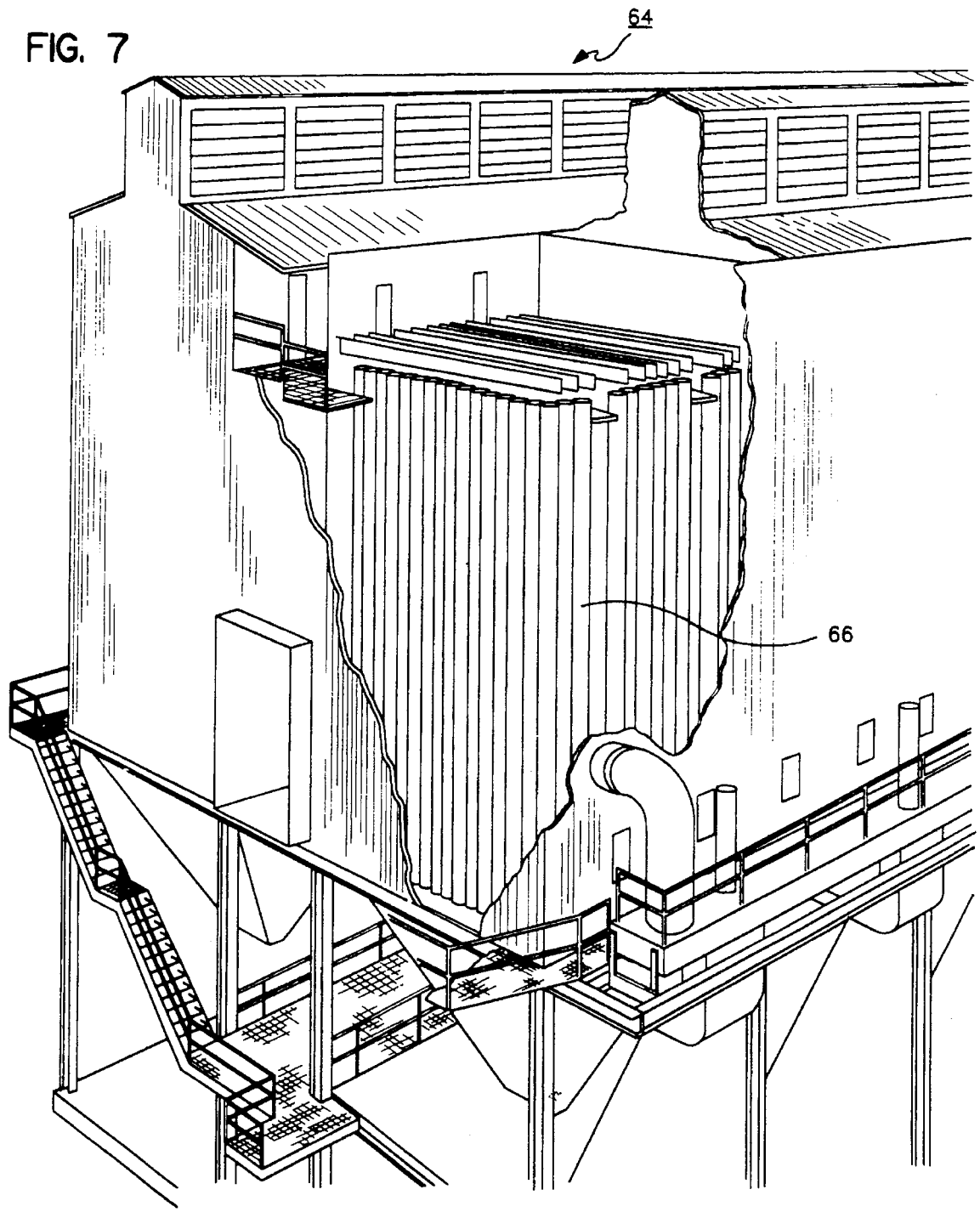
FIG. 7 is a three-quarter perspective view of a shaker or reverse air filter house illustrating another application for the apparatus of the present invention.

It should be understood that the principles of the present invention can be utilized with virtually any form of air filter apparatus and with a wide variety of filter house constructions. FIG. 7 illustrates yet another application for the sensing apparatus of the present invention. In this example, the filter house 64 comprises a reverse air or "shaker" house, whereby dust is accumulated on the inside of the filter bags 66, with dust periodically cleaned by either blowing reverse air or by shaking the filter. Although the present invention may be mounted over top of the filters to detect leaks in this environment, it may also be desirable to mount the apparatus of the present invention along the sides of these filters to detects leaks along their lengths.

In all embodiments of the present invention, an improved method for monitoring filter performance and integrity has been provided. Among the common advantages of the present invention are ease in installation, the ability to retrofit existing filter apparatus, relative simplicity of apparatus and resulting reliability, and ease in maintenance. Further, labor costs, both in time and health risks to workers, is greatly diminished through the use of the present invention. Most importantly, the present invention is believed to be able to detect leaks faster and more reliably than any existing detection device, assuring better overall filtration house efficiency.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A method for monitoring a particle filtration unit releasing particles dispersed in air that comprises:

providing an array of filter devices;

providing at least one light source positioned adjacent the array of filter devices projecting its light across the filter devices;

providing at least one sensor positioned to receive signals from the at least one light source across the array of filter devices;

providing a means to measure changes in the amount of light received by the at least one sensor;

measuring an amount of light passing across the array of filter devices between the at least one light source and the sensor to establish a base-line measurement;

re-measuring the amount of light passing across the array of filter devices between the at least one light source and the at least one sensor to provide current measurements;

comparing the base-line measurements to the current measurements;

whereby changes in filter device status are detected when a current measurement differs from the base-line measurement.

2. The method of claim 1 wherein said array of filter devices comprises a series of filter devices mounted in a matrix of rows and columns;

providing two sets of light sources and sensors, one set arranged to measure across the rows of filter devices and one set arranged to measure across columns of filter devices;

detecting changes in the status of any given filter device by comparing the measurements provided by each set of light sources and sensors to determine an intersect in the matrix.

3. The method of claim 1 that further comprises:

providing continuous measuring of the light across the filter device.

4. The method of claim 1 that further comprises:

providing periodic measuring of the light across the filter device.

5. The method for monitoring a particle filtration unit of claim 1, wherein said means to measure changes in the amount of light received by the at least one sensor comprises at least one microcontroller which monitors analog signals from the at least one detector, converts the analog signals into digital signals.

6. A detection device for use with a particle filtration unit to measure particles dispersed in the clean region of the filtration unit that comprises:

at least one light source, the light source adapted to be positioned on one side of a filter device array;

at least one corresponding sensor for detecting light from the at least one light source, the sensor adapted to be positioned to receive light signals from the at least one light source across the filter device array;

a meter to measure the amount of light received by the at least one sensor from the at least one light source;

means to electronically record and compare measurements from the at least one sensor;

wherein changes in measurements from the at least one sensor detect changes in the status of the filter device array.

7. The detection device of claim 6 wherein the device includes at least one mirror to change the direction of light traveling between the at least one light source and the at least one detector.

8. The detection device of claim 7 wherein multiple mirrors are employed and at least one of the mirrors comprises a semi-transparent mirror that is simultaneously transparent to and reflective of the at least one light source.

9. The detection device of claim 6 wherein the at least one light source is pivotally mounted in the filtration unit to allow the direction of its light beam to be altered so as to establish multiple light paths through the filtration unit.

10. The detection device of claim 6 wherein the filtration unit comprises an array of multiple filter devices mounted in a matrix of rows and columns;

the device comprises at least two sets of multiple light sources and multiple sensors, a first set mounted to measure across the rows of the filter devices and a second set mounted to measure across the columns of the filter devices.

11. The detection device of claim 10 wherein the means to electronically record and compare measurements from the at least one sensor compares signals from the at least two sets of lights sources and sensors so as to pinpoint the location in the matrix of filter devices where a particle leak has occurred.

12. The detection device of claim 6, wherein said at least on light source is selected from the group consisting of incandescent light, halogen light, arc light, fluorescent light, laser, infrared light and ultraviolet light.

13. The detection device of claim 6, wherein said meter to measure the amount of light received by the at least one sensor comprises at least one microcontroller which monitors analog signals from the at least one detector, converts the analog signals into digital signals.

14. A detection device for use with a filter device house to measure particles dispersed on the clean side of a filter device array within the filter device house, that comprises:

at least one light source, the light source adapted to be positioned on one side of a filter device array;

at least one corresponding sensor for detecting light from the at least one light source, the sensor adapted to be positioned to receive light signals from the at least one light source across the filter device array, each of said at least one corresponding sensor having a microcontroller which monitors analog signals from the sensor, converts the analog signals to digital signals;

a single bus cable line for carrying digital signals attached to the at least one sensor; and means to electronically record and compare measurements attached to the bus cable which receives the digital signals from the at least one sensor;

wherein changes in measurements from the at least one sensor detect changes in the status of the filter device array.

15. The detection device of claim 14 wherein the device includes at least one mirror to change the direction of light traveling between the at least one light source and the at least one detector.

16. The detection device of claim 15, wherein multiple mirrors are employed and at least one of the mirrors comprises a semi-transparent mirror that is simultaneously transparent to and reflective of the at least one light source.

17. The detection device of claim 14, wherein the at least one light source is pivotally mounted in the filtration unit to allow the direction of its light beam to be altered so as to establish multiple light paths through the filter device house.

18. The detection device of claim 14, wherein said at least on light source is selected from the group consisting of incandescent light, halogen light, arc light, fluorescent light, laser, infrared light and ultraviolet light.

* * * * *